July 1, 1924.  1,499,414
J. SLEPIAN
ELECTROLYTE FOR ELECTROLYTIC CELLS
Filed Nov. 20, 1920
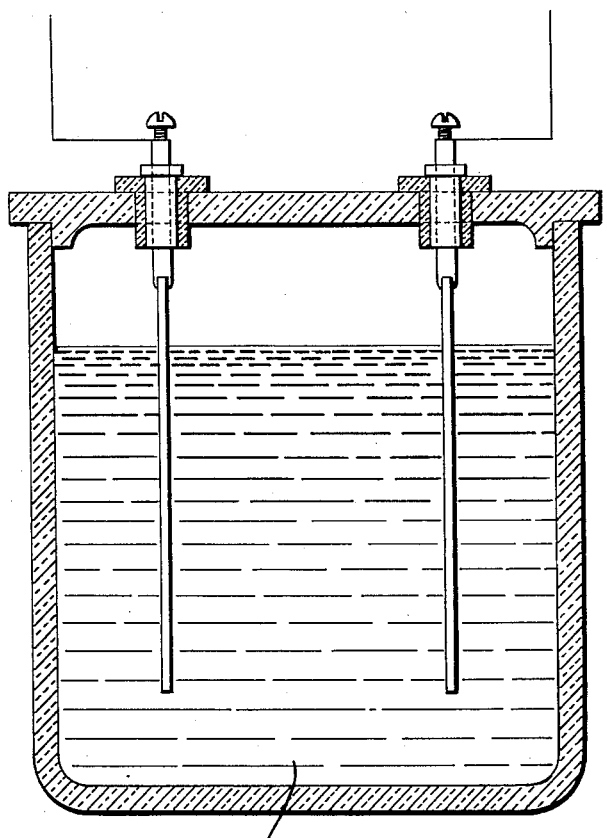
A borate, a phosphate and a fluoride in alkaline solution
WITNESSES:
R. J. Butler
W. C. Bierman
INVENTOR
Joseph Slepian.
BY
Wesley G. Carr
ATTORNEY Patented July 1, 1924.

1,499,414

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

ELECTROLYTE FOR ELECTROLYTIC CELLS.

Application filed November 20, 1920. Serial No. 425,339.

*To all whom it may concern:*

Be it known that I, JOSEPH SLEPIAN, a citizen of the United States, and a resident of Swissvale, in the county of Allegheny and State of Pennsylvania, have invented a new and useful Improvement in Electrolytes for Electrolytic Cells, of which the following is a specification.

This invention relates to electrolytes adapted for use in electrolytic cells of various types, such as electrolytic condensers, lightning arresters, rectifiers and the like. The present invention is an improvement over the invention described and claimed in my copending application, Serial No. 343,519, filed December 9, 1919, for electrolyte for electrolytic cells.

Electrolytic cells for the above stated and similar purposes are usually constructed with two sets of closely spaced electrodes consisting of closely folded and cut sheets of thin metal, such as aluminum, to present a large electrode-surface area in a small space. A suitable number of such electrodes of opposite polarity are assembled in a container which is filled with a suitable electrolyte.

Such electrolyte must be capable of forming a film on the surface of the metal electrode, which film should be impervious to temperature changes and be permanent over a considerable range of voltages. The cell thus formed should have a low power factor or low internal loss and should not develop any material amount of precipitates.

Heretofore, electrolytes for the above purposes have been defective in that the power factor of the cell resulting from the use of these electrolytes was too high, causing a relatively large power loss. It was also practically impossible to use such cell at a comparatively high temperature, since precipitates were formed at the higher temperatures which clogged up the spaces between the folds or laminations of the electrodes. The electrolyte described in my copending application above referred to, in part obviates these disadvantages providing an electrolyte which has a low power factor, and one which does not allow appreciable deposition of precipitates from the electrolyte.

The present invention is designed to more perfectly eliminate the disadvantages hitherto encountered in electrolytes of this character, it being among the objects thereof to provide an electrolyte which gives a low power factor, is capable of use at high temperatures and does not deposit precipitates in any appreciable amount.

In practising my invention, I provide an electrolyte of any suitable character, preferably of the type described in my copending application, and add to the same a small amount of a phosphorus compound, such as a phosphate. Generally, my improved electrolyte consists of a borate, a fluoride, and a phosphate, preferably the sodium salts, dissolved in water.

In the accompanying drawing constituting a part hereof, the single figure is a diagrammatic view of a cell containing my new electrolyte.

A borate, such as borax, is desirable for use in electrolytes since it has a low power factor which does not increase with time, remaining approximately constant. However, after a relatively short time, precipitates begin to form in a borax electrolyte which, after a while, become excessive, rendering the cell inefficient. Various phosphates have been proposed as electrolytes, since phosphates generally do not decompose and are remarkably free from precipitates. However, the power factor thereof changes considerably with time. A solution of a phosphate at first has a rather high power factor which rapidly decreases to a minimum in a very short time, after which the power factor gradually increases until it becomes excessive.

My invention combines the desirable characteristics of both phosphates and borates, providing an electrolyte which does not deposit precipitates, and remains clean at all times, as does a phosphate, and combines therewith the low power factor characteristic of a borate. A composition of electrolyte which I have found to be efficient for use in electrolytic cells is as follows:

$Na_2B_4O_7.10H_2O$ 11.25 gr.,
$Na_3PO_4$ 5.75 gr.,
$NaF$ 1 gr.,
$H_2O$ 1200 gr.

An electrolyte embodying a phosphate and a borate is practically a perfect electrolyte for electrolytic condensers, lightning arresters, rectifiers and the like, especially when a fluoride is added to the solution, which is alkaline. I have found that a cell containing an electrolyte of this kind may be operated continuously at or above 90° C., or practically the boiling point of the solution, with no deterioration of electrolyte, film, or electrode, whereas, with prior electrolytes, a temperature of 40° C. was probably the maximum that could be utilized. My cell has a power factor between 4% and 5% at the high temperature, being equally as efficient as a borate in this respect and having the added advantages that the electrodes remain remarkably clean, allowing a free circulation of the electrolyte between the folds of the electrodes.

It is obvious that my invention, although described in connection with a specific embodiment thereof, is not limited to the details or specific proportions set forth, but resides essentially in the use of a phosphate in conjunction with any electrolyte of the film-forming type, generally including a borate.

I claim as my invention:

1. An electrolyte for electrolytic condensers, lightning arresters, rectifiers, and the like comprising a boron compound and a phosphate.

2. An electrolyte for electrolytic condensers, lightning arresters, rectifiers, and the like comprising a borate and a phosphate.

3. An electrolyte for electrolytic condensers, lightning arresters, rectifiers, and the like comprising a borate, phosphate and a fluoride.

4. An electrolyte for electrolytic condensers, lightning arresters, rectifiers, and the like comprising sodium borate, sodium phosphate and sodium fluoride.

5. An electrolyte for electrolytic condensers, lightning arresters, rectifiers and the like comprising sodium borate 11.25 parts, sodium phosphate 5.75 parts, sodium fluoride 1 part and water 1200 parts.

6. An electrolyte for electrolytic condensers, lightning arresters, rectifiers, and the like comprising a boron compound and a phosphate in alkaline solution.

7. An electrolyte for electrolytic condensers, lightning arresters, rectifiers and the like comprising a borate and a phosphate in alkaline solution.

8. An electrolyte for electrolytic condensers, lightning arresters, rectifiers and the like comprising a borate, a phosphate and a fluoride in alkaline solution.

In testimony whereof, I have hereunto subscribed my name this 10th day of November, 1920.

JOSEPH SLEPIAN.